US009674257B2

United States Patent
Eyler et al.

(10) Patent No.: US 9,674,257 B2
(45) Date of Patent: Jun. 6, 2017

(54) PLACESHIFTING LIVE ENCODED VIDEO FASTER THAN REAL TIME (71) Applicant: SLING MEDIA INC., Foster City, CA (US)

(72) Inventors: David Randolph Eyler, San Francisco, CA (US); Padmanabha R. Rao, Palto Alto, CA (US); Raghuveer Tarra, Cupertino, CA (US); Ilya Asnis, San Jose, CA (US)

(73) Assignee: EchoStar Technologies L.L.C., Englewood, CO (US)

( * ) Notice: Subject to any disclaimer, the term of this patent is extended or adjusted under 35 U.S.C. 154(b) by 134 days.

(21) Appl. No.: 14/585,873

(22) Filed: Dec. 30, 2014

(65) Prior Publication Data

US 2015/0188966 A1 Jul. 2, 2015

Related U.S. Application Data (60) Provisional application No. 61/922,591, filed on Dec. 31, 2013.

(51) Int. Cl.
*H04L 29/06* (2006.01)
*H04L 12/26* (2006.01)

(52) U.S. Cl.
CPC ............ *H04L 65/80* (2013.01); *H04L 65/602* (2013.01); *H04L 43/08* (2013.01)

(58) Field of Classification Search
USPC ................................. 709/231, 246, 203, 220
See application file for complete search history.

(56) References Cited

U.S. PATENT DOCUMENTS

| 6,263,503 | B1 | 7/2001 | Margulis | |
|---|---|---|---|---|
| 6,637,031 | B1* | 10/2003 | Chou | H04N 7/17336 348/384.1 |
| 7,707,614 | B2 | 4/2010 | Krikorian et al. | |
| 7,877,776 | B2 | 1/2011 | Krikorian et al. | |
| 7,917,932 | B2 | 3/2011 | Krikorian | |
| 8,099,755 | B2 | 1/2012 | Bajpai et al. | |
| 8,266,657 | B2 | 9/2012 | Margulis | |
| 8,914,836 | B2* | 12/2014 | Shivadas | H04N 21/27 725/109 |
| 9,191,610 | B2* | 11/2015 | Kulkarni | G11B 27/034 |
| 9,219,883 | B2* | 12/2015 | Robinson | H04N 7/16 |
| 2005/0244138 | A1* | 11/2005 | O'Connor | G11B 27/034 386/298 |
| 2006/0168637 | A1* | 7/2006 | Vysotsky | H04L 12/1813 725/116 |
| 2007/0201500 | A1* | 8/2007 | Deshpande | H04L 47/10 370/412 |
| 2010/0135636 | A1* | 6/2010 | Zhang | H04N 5/783 386/343 |

(Continued)

*Primary Examiner* — Jude Jean Gilles
(74) *Attorney, Agent, or Firm* — LK Global (57) ABSTRACT

Systems, methods and devices are described to encode, deliver and playback a placeshifted media stream via the Internet or another network. The media stream is appropriately encoded at a quality level (e.g., at a bit rate, frame rate, resolution, etc.) that allows content to be delivered faster than it is played back. This sort of "faster than real time" encoding allows the placeshifted media stream to be buffered at the remote device for more effective performance.

17 Claims, 3 Drawing Sheets

(56) References Cited

U.S. PATENT DOCUMENTS

| | | | |
|---|---|---|---|
| 2013/0003864 A1* | 1/2013 | Sullivan | H04N 19/44 375/240.25 |
| 2013/0007816 A1* | 1/2013 | Krikorian | H04N 21/4398 725/74 |
| 2013/0286879 A1* | 10/2013 | ElArabawy | H04N 21/26208 370/252 |
| 2013/0298170 A1* | 11/2013 | ElArabawy | H04W 28/0231 725/62 |

* cited by examiner

PLACESHIFTING LIVE ENCODED VIDEO FASTER THAN REAL TIME

PRIORITY CLAIM

This application claims priority to U.S. Provisional Patent Application Ser. No. 61/922,591 filed on Dec. 31, 2013.

TECHNICAL FIELD

The present disclosure generally relates to video streaming over a network, and more particularly relates to systems, devices and methods for placeshifting live encoded video over the Internet or another network.

BACKGROUND

Various forms of set-top boxes and related devices are known in the art. Recently, consumers have expressed significant interest in "place shifting" devices that allow viewing of television or other media content at locations other than their primary television set. Place shifting devices typically packetize media content that can be transmitted over a local or wide area network to a portable computer, mobile phone, personal digital assistant, remote television or other remote device capable of playing back the packetized media stream for the viewer. Placeshifting therefore allows consumers to view their media content from remote locations such as other rooms, hotels, offices, and/or any other locations where portable media player devices can gain access to a wireless or other communications network.

Typically, placeshifted media streams are encoded "on the fly" to accommodate then-current network bandwidth, processing resources, and the like. Generally speaking, the placeshifted stream is encoded at the best possible quality that can be transmitted over the network and presented to the viewer without stalling during playback. Changing network conditions and other factors, however, can make maximal quality streaming without stalling a substantial challenge in some settings.

It is therefore desirable to create systems and methods for efficiently and effectively providing placeshifted video content to a remote viewer. These and other desirable features and characteristics will become apparent from the subsequent detailed description and the appended claims, taken in conjunction with the accompanying drawings and this background section.

BRIEF SUMMARY

According to various exemplary embodiments, systems, devices and methods are presented to encode a placeshifted media stream "faster than real time" so that future content can be buffered at the media player. In many instances, the quality of the encoded video may be reduced from the maximal quality that could otherwise be provided. That is, video quality may be sacrificed to provide a greater portion of the program more quickly. Even though the content is still live encoded in response to a viewer instruction, then, the encoding may nevertheless occur at a rate that is faster than the playback rate to increase the amount of buffered content, or for any other purpose.

Some embodiments provide methods executable by placeshifting devices or the like to encode a media stream for placeshifting to a remote media player via a network. The method suitably comprises: initially encoding the media stream by the placeshifting device at a first quality level; delivering the media stream encoded at the first quality level from the placeshifting device to the remote media player via the network for playback of the media stream by the remote media player; monitoring the delivery of the media stream via the network by the placeshifting device; and, while the media stream is being delivered to the remote media player via the network, the placeshifting device adapting the encoding of the media stream in response to the monitoring, wherein the adapting comprises selecting a new quality level such that the media stream is delivered over the network to the remote media player at a rate that is faster than a playback rate of the remote media player.

Other embodiments provide placeshifting devices to encode and transmit media streams to remotely-located media player devices via a network. The placeshifting device suitably comprises an interface to the network, an encoder, and a control processor. The control processor is configured to receive a selection of a media program from the remotely-located media player device via the interface, to direct the encoder to initially encode the media stream at a first quality level, to transmit the media stream to the remote media player device via the interface for playback of the media stream by the remote media player device, to monitor the delivery of the media stream and to adapt the encoding of the media stream in response to the monitoring while the media stream is being transmitted on the network to thereby select a new quality level such that the media stream is delivered over the network to the remote media player at a rate that is faster than a playback rate of the remote media player.

Still other embodiments provide a remote media player device to render digital media content to a viewer. The remote media player device comprises an interface to a network, a memory and a processor. The processor is configured to receive a media stream via the interface, wherein the media stream is encoded by a remotely-located placeshifting device in response to a selection by the viewer while the media stream is being transferred to the media player device, and wherein the processor is further configured to decode the encoded media stream for playback of the media stream to a viewer at a playback rate, wherein the encoded media stream is received at the remote media player device at a rate that is faster than the playback rate.

Additional embodiments could provide other systems, devices, remote devices, media players, software programs, encoders, processes, methods and/or the like that perform these or other functions. Various embodiments, aspects and features are described in detail below.

BRIEF DESCRIPTION OF THE DRAWING FIGURES

Exemplary embodiments will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention.

Furthermore, there is no intention to be bound by any theory presented in the preceding background or the following detailed description.

Traditional place shifting methods involve encoding a video stream as it is delivered to a remotely-located media player for playback. Most conventional placeshifting systems typically transcode video/media content in essentially real time. That is, if a minute of video is going to be place-shifted, most conventional encoders would take roughly one minute to transcode the one minute of content. If the encoder were to advance the live encoding in front of the playback, then encoding quality would typically be improved to take advantage of the excess capability. Modern chip technology, however, now allows for transcoding of live and recorded video content at rates that are faster than real time. That is, even though the placeshifted stream is still live encoded simultaneously with transmission and playback, media content can now be encoded at rates that are faster than the playback rate, often without unduly sacrificing video quality. Live broadcasts are, of course, limited by the rate at which the content is received; it is not possible look into the future before the live event occurs, or at least before the live content is received at the encoder. Time delayed and previously-recorded content, however, can now be transcoded and placeshifted for simultaneous delivery at rates faster than real time. This could include, for example, content recorded on a digital video recorder (DVR) or the like. Even live broadcast streams can benefit from faster-than-real-time encoding if the user pauses or suspends video playback temporarily; if the user's playback point is behind the live broadcast, then the encoded video stream could nevertheless be provided to the player before playback time, thereby allowing additional buffering in case of interruption, or even allowing some degree of "fast forwarding" until the live broadcast time is reached. Encoding a placeshifted stream at a rate that is faster than the playback rate can therefore be beneficial because it can allow a relatively large video buffer to be built up on the media player, which in turn can make playback smoother even if the network speed temporarily drops. These benefits can be realized even though the encoding is occurring at the same time that the encoded stream is being transmitted for playback. "Live encoding" as used herein, then, refers to encoding a media stream in response to a viewer instruction so that the encoding occurs simultaneously with the delivery of the encoded content for playback to the viewer. "Live encoding" may be performed on previously-stored content (e.g., programs stored in a DVR or VOD site) as well as live television broadcasts, as desired.

To give an example, suppose the user is placeshifting a program that is recorded on a DVR to a mobile phone at a bit rate of two Mbps or so. Two Mbps quality approaches the current limits of a high speed LTE cellular network for this example. This speed is more than is necessary to show very high quality video on a phone-sized screen, so instead of continuing to encode at 2 Mbps, the encoder could instead encode at 1.5 Mbps (or so) and use faster than real time transcoding to encode and transmit additional video content to the phone faster than the phone can play back the video stream. This will allow the phone to buffer up a comparatively large amount of video for playback. Other embodiments may use different bit rates and mobile devices, but the concepts could be readily applied in any number of other settings.

Figure 1:
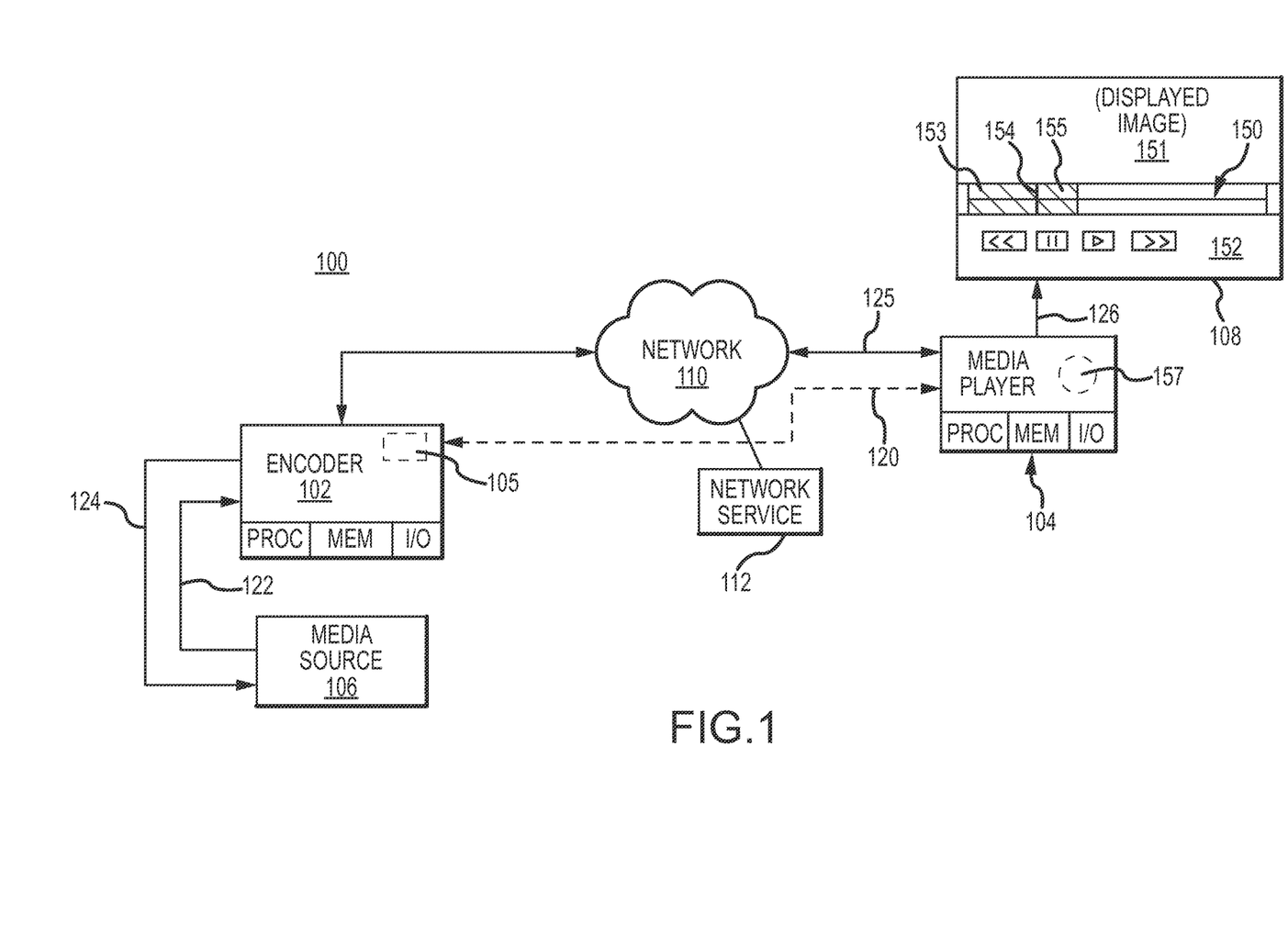
FIG. 1 is a block diagram of an exemplary media encoding system.

Turning now to the drawing figures and with initial reference to FIG. 1, an exemplary placeshifting system 100 suitably includes a placeshifting encoder system 102 that receives media content 122 from a content source 106, encodes the received content into a streaming format, and then transmits the encoded media stream 120 to a media player 104 over network 110 while continuing to encode additional content. The media player 104 suitably receives the encoded stream 120, decodes the stream, and presents the decoded content to a viewer on a television or other display 108. In various embodiments, a server 112 may also be provided to communicate with encoder system 102 and/or player 104 via network 110 to assist these devices in locating each other, maintaining security, providing or receiving content or information, and/or any other features as desired. This feature is not required in all embodiments, however, and the concepts described herein may be deployed in any data streaming application or environment, including placeshifting but also any other media or other data streaming situations as desired.

Placeshifting encoder system 102 is any component, hardware, software logic and/or the like capable of transmitting a packetized stream of media content over network 110. In various embodiments, placeshifting device 102 incorporates suitable encoder and/or transcoder (collectively "encoder") logic to convert audio/video or other media data 122 into a packetized format that can be transmitted over network 110. The media data 122 may be received in any format, and may be received from any internal or external source 106 such as any sort of broadcast, cable or satellite television programming source, a "video-on-demand" or similar source, a digital video disk (DVD) or other removable media, a video camera, and/or the like. Encoder system 102 encodes media data 122 to create media stream 120 in any manner. In various embodiments, encoder system 102 contains a transmit buffer 105 that temporarily stores encoded data prior to transmission on network 110. As buffer 105 fills or empties, one or more parameters of the encoding (e.g., the bit rate of media stream 120) may be adjusted to maintain desirable picture quality and data throughput in view of the then-current network performance. Changes in the network transfer rate may be identified from, for example, changes in the utilization of the outgoing buffer 105. Other embodiments may additionally or alternatively consider feedback from the remote media player 104, or any other data as appropriate. As noted herein, encoding parameters such as the bit rate, frame rate, resolution, etc. of the encoded stream 120 may be set so that the content is delivered to the remote media player 104 faster than the player 104 plays back the media stream Several examples of encoding systems 102 may be implemented using any of the various SLINGBOX® products available from Sling Media, Inc. of Foster City, Calif., although other products could be used in other embodiments. Many different types of encoder systems 102 are generally capable of receiving media content 122 from an external source 106 such as any sort of digital video recorder (DVR), set top box (STB), cable or satellite programming source, DVD player, and/or the like. In such embodiments, encoder system 102 may additionally provide commands 124 to the source 106 to produce desired signals 122. Such commands 124 may be provided over any sort of wired or wireless interface, such as an infrared or other wireless transmitter that emulates remote control commands receivable by the source 106.

In other embodiments, encoder system 102 may be integrated with any sort of content receiving or other capabilities typically affiliated with source 106. Encoder system 102 may be a hybrid STB, receiver, media player, DVR, game console or other device, for example, that also provides transcoding and placeshifting features. Such a device may receive satellite, cable, broadcast and/or other signals that encode television programming or other content received from an antenna, modem, server and/or other source. The receiver may further demodulate or otherwise decode the received signals to extract programming that can be locally viewed and/or place shifted to a remote player 104 as appropriate. Such devices 102 may also include a content database stored on a hard disk drive, memory, or other storage medium to support a personal or digital video recorder (DVR) feature or other content library as appropriate. Hence, in some embodiments, source 106 and encoder system 102 may be physically and/or logically contained within a common box, component, housing or chassis.

In still other embodiments, encoder system 102 is a software program, applet or the like executing on a conventional computing system (e.g., a personal computer). In such embodiments, encoder system 102 may encode, for example, some or all of a screen display typically provided to a user of the computing system for placeshifting to a remote location. One device capable of providing such functionality is the SlingProjector® product available from Sling Media, Inc. of Foster City, Calif., which executes on a conventional personal computer, although other products could be used as well.

Media player 104 is any device, component, module, hardware, software and/or the like capable of receiving a media stream 120 from one or more encoder systems 102. In various embodiments, remote player 104 is personal computer (e.g., a "laptop" or similarly portable computer, although desktop-type computers could also be used), a mobile phone, a personal digital assistant, a personal media player (such as the media player products available from Roku Inc. of Saratoga, Calif.) or the like. In many embodiments, remote player 104 is a general purpose computing device that includes a media player application 157 in software or firmware that is capable of securely connecting to placeshifting encoder system 102, as described more fully below, and of receiving and presenting media content to the user of the device as appropriate. In other embodiments, however, media player 104 is a standalone or other separate hardware device capable of receiving the media stream 120 via any portion of network 110 and decoding the media stream 120 to provide an output signal 126 that is presented on a television or other display 108. Media players 104 typically include any conventional processors, memory and input/output features found in typical computing systems.

Network 110 is any digital or other communications network capable of transmitting messages between senders (e.g., encoder system 102) and receivers (e.g., receiver 104). In various embodiments, network 110 includes any number of public or private data connections, links or networks supporting any number of communications protocols. Network 110 may include the Internet, for example, or any other network based upon TCP/IP or other conventional protocols. In various embodiments, network 110 also incorporates a wireless and/or wired telephone network, such as a cellular communications network for communicating with mobile phones, personal digital assistants, and/or the like. Network 110 may also incorporate any sort of wireless or wired local area networks, such as one or more IEEE 802.3 and/or IEEE 802.11 networks.

Encoder system 102 and/or player 104 are therefore able to communicate with player 104 in any manner (e.g., using any sort of data connections 128 and/or 125, respectively). Such communication may take place over a wide area link that includes the Internet and/or a telephone network, for example; in other embodiments, communications between devices 102 and 104 may take place over one or more wired or wireless local area links that are conceptually incorporated within network 110. In various equivalent embodiments, encoder system 102 and receiver 104 may be directly connected via any sort of wired or wireless link (e.g., an Ethernet cable or the like) with little or no other network functionality provided.

Many different placeshifting scenarios could be formulated based upon available computing and communications resources, consumer demand and/or any other factors. In various embodiments, consumers may wish to placeshift content within a home, office or other structure, such as from a placeshifting encoder system 102 to a desktop or portable computer located in another room. In such embodiments, the content stream will typically be provided over a wired or wireless local area network operating within the structure. In other embodiments, consumers may wish to placeshift content over a broadband or similar network connection from a primary location to a computer or other remote player 104 located in a second home, office, hotel or other remote location. In still other embodiments, consumers may wish to placeshift content to a mobile phone, personal digital assistant, media player, video game player, automotive or other vehicle media player, and/or other device via a mobile link (e.g., a GSM/EDGE or CDMA/EVDO connection, any sort of 3G, 4G and/or subsequent telephone link, an IEEE 802.11 "Wi-fi" link, and/or the like). Several examples of placeshifting applications available for various platforms are provided by Sling Media, Inc. of Foster City, Calif., although the concepts described herein could be used in conjunction with products and services available from any source.

Encoder system 102, then, generally creates a media stream 120 that is routable on network 110 based upon content 122 received from media source 106. As noted above, the encoding of media stream 120 may occur simultaneous with transmission of the stream on network 110 but at a rate that is faster than the rate at which content is received and/or played back to the viewer, thereby allowing excess content to be cached at media player 104. In the example shown in FIG. 1, media player 104 suitably provides an interface 151 that includes the rendered media stream, along with user controls 152 to initiate play, pause, fast forward, rewind or other trick play functions. Interface 151 also includes a buffer indicator 150 that shows the contents of the media stream for the program currently being played back for the user. In this example, a portion 153 of buffer 150 is shaded, indicating that that portion of the encoded media program has been received at the media player 104. The current playback location is indicated by feature 154; in various embodiments, the user may manipulate feature 154 to jump forward or backward in buffer 150 and thereby change the playback location in the rendered program, as desired.

In the example of FIG. 1, a portion 155 of buffer 150 in advance of the current playback position 154 is shaded, indicating that future content has already been received and stored at the media player 104. This content may be stored in a memory, disk cache or other buffer, as appropriate. Since the media stream 120 in this example was encoded at a rate that is faster than the playback rate, the media player 104 is able to cache future portions 155 of the program. This allows playback to continue even if connection 125 should slow down or disconnect, if processing loads on device 104 reduce the decoding capability, or if other factors should occur during playback. Further, the user may be able to skip ahead in buffer 150 by fast forwarding or moving indicator 154, as desired. Even if the program being rendered is a live broadcast, encoding may continue while the user is paused or otherwise disengaged from the live stream, thereby allowing content in the future of the then-current playback point 154 to be cached at player 104. Other interfaces may represent or control equivalent concepts in any other manner, as desired.

Figure 2:
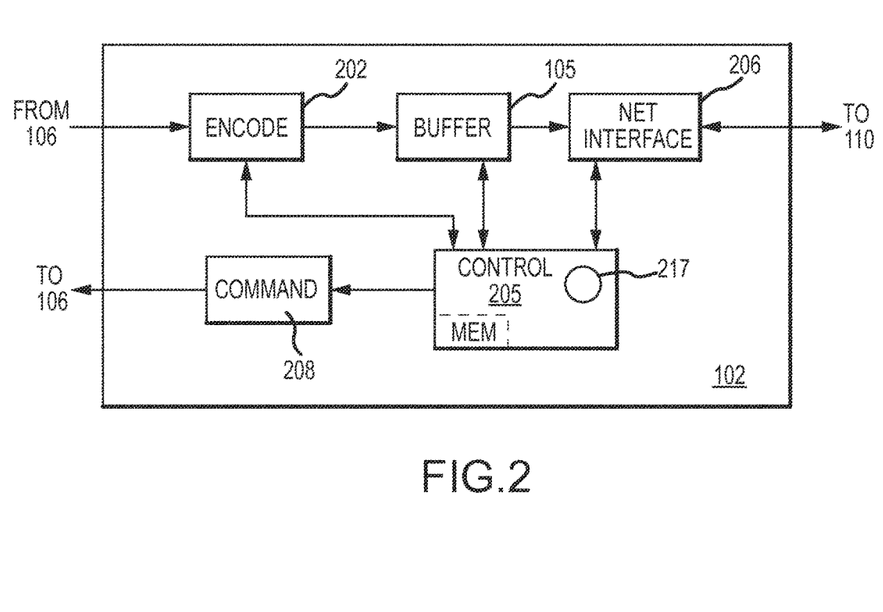
FIG. 2 is a block diagram of an exemplary media encoding device.

With reference now to FIG. 2, encoder system 102 typically includes an encoder module 202, a buffer 105 and a network interface 206 in conjunction with appropriate control logic 205. In operation, encoder module 202 typically receives media content 122 from an internal or external source 106, encodes the data into the desired format for media stream 120, and stores the encoded data in buffer 105. Network interface 206 then retrieves the formatted data from buffer 105 for transmission on network 110. Control module 205 suitably monitors and controls the encoding and network transmit processes carried out by encoding module 202 and network interface 206, respectively, and may perform other features as well. In the example of FIG. 2, an encoder control application 217 suitably resides as software or firmware in memory or other storage and is executed by control module 205 to control and adapt the encoding of media stream 120 using the techniques described herein. Encoder system 102 may also have a module 208 or other feature capable of generating and providing commands 124 to an external media source 106, as described above.

In the exemplary embodiment shown in FIG. 2, modules 202, 105, 205, 206 and 208 may be implemented in software or firmware residing in any memory, mass storage or other storage medium within encoder system 102 in source code, object code and/or any other format. Such features may be executed on any sort of processor or microcontroller executing within encoder system 102. In various embodiments, encoder system 102 is implemented as a system on a chip (SoC) type system with integrated processing, storage and input/output features. Various SoC hardware implementations are available from Texas Instruments, Conexant Systems, Broadcom Inc., VIXS Inc., and/or other suppliers as appropriate. Other embodiments may use any number of discrete and/or integrated processing components, memories, input/output features and/or other features as desired.

As noted above, creating a media stream 120 typically involves encoding and/or transcoding an input media stream 122 received from an internal or external media source 106 into a suitable digital format that can be transmitted on network 110. Generally, the media stream 120 is placed into a standard or other known format (e.g., the WINDOWS MEDIA format available from the Microsoft Corporation of Redmond, Wash. although other formats such as the HTTP LIVE STREAMING format, REALPLAYER format, MPEG format, and/or the like could be used in any other embodiments) that can be transmitted on network 110. This encoding may take place, for example, in any sort of encoding module 202 as appropriate. Encoding module 202 may be any sort of hardware (e.g., a digital signal processor or other integrated circuit used for media encoding), software (e.g., software or firmware programming used for media encoding that executes on the SoC or other processor described above), or the like. Encoding module 202 is therefore any feature that receives media data 122 from the internal or external source 106 (e.g., via any sort of hardware and/or software interface) and encodes or transcodes the received data into the desired format for transmission on network 110. Although FIG. 2 shows a single encoding module 202, in practice system 102 may include any number of encoding modules 202. Different encoding modules 202 may be selected based upon preference of player 104, network conditions, and/or the like.

In various embodiments, encoder 202 may also apply other modifications, transforms and/or fillers to the received content before or during the transcoding process. Video signals, for example, may be resized, cropped and/or skewed. Similarly, the color, hue and/or saturation of the signal may be altered, and/or noise reduction or other filtering may be applied. Audio signals may be modified by adjusting volume, sampling rate, mono/stereo parameters, noise reduction, multi-channel sound parameters and/or the like. Digital rights management encoding and/or decoding may also be applied in some embodiments, and/or other features may be applied as desired.

As initially noted above, system 102 may also include a content database stored on a hard disk drive, memory, or other storage medium to support a personal or digital video recorder (DVR) feature or other content library as appropriate. For example, the media that is streamed to, and received by system 102, as an alternative to (or in addition to) being displayed on the display device 108, may be recorded and stored on the storage media, such as a DVR, for later playback and viewing as desired. Again, encoding parameters may be set to facilitate delivery that is faster than the playback rate of the media player 104, thereby allowing at least some of the transcoded content 120 to be buffered at the media player 104 for playback in the future.

Figure 3:
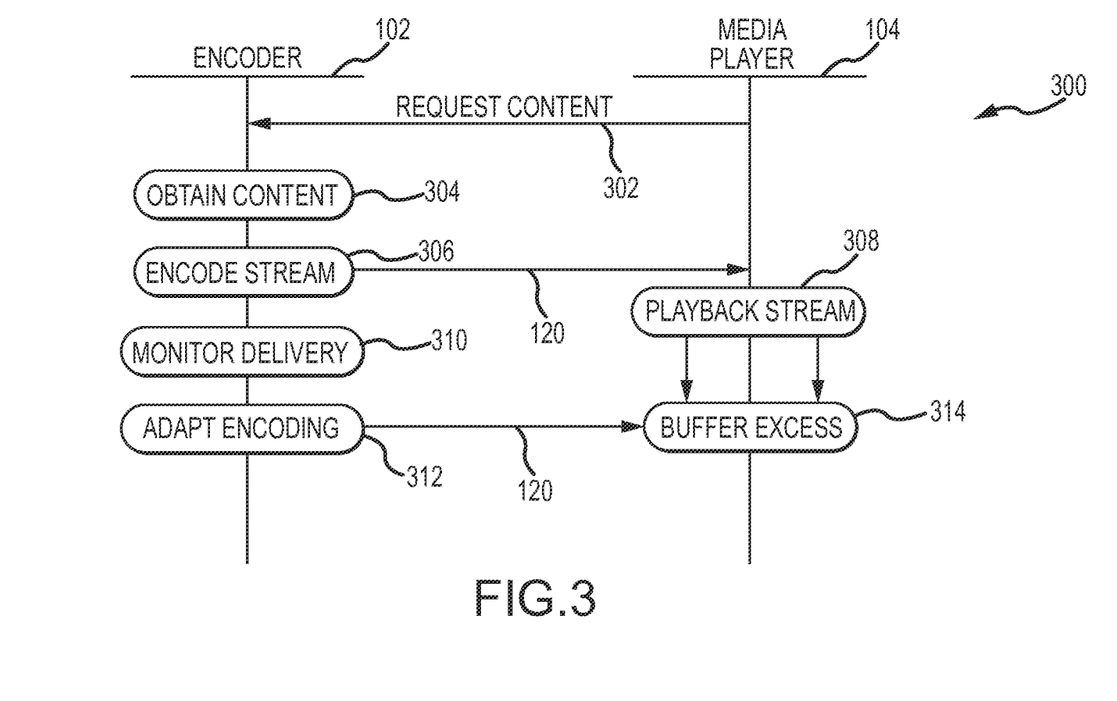
FIG. 3 illustrates an example process to deliver encoded content faster than real time.

FIG. 3 shows an exemplary process 300 to adapt the encoding of media stream 120 to provide faster than real time encoding, as desired. The various functions shown in FIG. 3 may be implemented in software, firmware or other programmable logic executing in media player 104 and/or encoder 102, as appropriate. Application 217 of encoder 102, for example, may control the various actions of encode module 202, while application 157 may control the various actions of media player 104. Other embodiments may carry out the various functions of process 300 using different logic or differently-organized logic, as desired.

In the example shown in FIG. 3, the media player 104 suitably requests content 120 for playback (function 302). The request suitably identifies television programming, recorded programs, or other media content available to encoder 102, as described above. The encoder 102 obtains the requested content (function 304) by controlling a content source 106, by obtaining the content from an internal source, or by taking other appropriate actions as described above.

The requested media stream 120 is initially encoded (function 306) for delivery to media player 104. Initial encoding parameters may be determined in any manner; various embodiments may initially encode at relatively low quality to provide a "fast start" of playback, and to avoid overloading an initially unknown network connection. Other embodiments may use any metrics of network quality and/or processing capabilities that may be available to provide an initial estimate of the throughput of the data connection between encoder 102 and media player 104.

Delivery of media stream 120 may be monitored (function 310) as desired. In various embodiments, the utilization of transmit buffer 105 could provide an indication of whether media stream 120 is being encoded at a rate that is faster than the delivery rate to media player 104. Feedback from media player 104 or other monitoring sites on network 110 could also be used, if desired.

As noted above, encoding parameters such as bit rate, frame rate, and resolution may be set and/or adapted (function 312) so that the video stream 120 is delivered to media player 104 faster than the video is played back to the viewer. Rather than simply setting the encoding parameters to levels that maximize quality over the available bandwidth, the quality may be deliberately set to a less-than-maximal level to increase the throughput in delivery. Various embodiments may further consider the type of media player 104 that is receiving the encoded stream 120; a mobile telephone with a relatively small screen, for example, may not need as much video resolution as a larger display screen. By deliberately encoding at less than the maximum value, some of the quality that would otherwise be available can be effectively traded for increased throughput. This increased throughput, in turn, may be used to transmit advance video data to the player, thereby allowing the player to cache content that is not yet requested for playback in a buffer (function 314) for later playback to the viewer. Again, this future content 155 could be used to reduce the effects of later outages, to allow fast forwarding, and/or for any other purpose.

Various embodiments therefore separate the video streaming rate from the playback rate of the player. By encoding "faster than real time", the media player can receive content at a rate that is faster than the playback rate, thereby allowing the player to store additional content for added reliability and/or functionality.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A method executable by a placeshifting device to encode a media stream for placeshifting to a remote media player via a network, the method comprising:
   initially encoding the media stream by the placeshifting device at a first encoding quality level;
   delivering the media stream encoded at the first quality level from the placeshifting device to the remote media player via the network for playback of the media stream by the remote media player, wherein the encoding and delivering of the media stream occur concurrently so that the media stream is a live encoded media stream;
   monitoring the delivery of the live encoded media stream via the network by the placeshifting device, wherein the monitoring comprises determining a decoding capacity of the remote media player; and
   while the live encoded media stream is being delivered to the remote media player via the network, the placeshifting device adapting the encoding of the live encoded media steam in response to the monitoring, wherein the adapting comprises selecting a new encoding quality level to match the decoding capacity of the remote media player such that the live encoded media stream is delivered over the network to the remote media player at a rate that is faster than a real time playback rate of the remote media player.

2. The method of claim 1 wherein the adapting comprises adjusting the quality of the encoded media stream so that the media stream is encoded faster than real time.

3. The method of claim 1 wherein the adapting comprises adapting at least one of a bit rate, a frame rate, and a resolution of the encoded media stream.

4. The method of claim 2 wherein the new quality level is deliberately set to be less than a maximum possible quality level so that some of the quality that would otherwise be available for playback of the live encoded media stream is traded for increased throughput of the live encoded media stream.

5. The method of claim 4 wherein the increased throughput is used to transmit advance video data to the player, thereby allowing the player to cache content of the live encoded video stream that is not yet requested for playback in a buffer.

6. A placeshifting device to encode and transmit a live encoded media stream to a remotely-located media player device via a network, the placeshifting device comprising:
   an interface to the network;
   an encoder; and
   a control processor configured to receive a selection of a media program from the remotely-located media player device via the interface, to initially encode the live encoded media stream in response to the received selection at a first quality level, to transmit the live encoded media stream to the remote media player device via the interface for playback of the live encoded media stream by the remote media player device, to monitor the delivery of the live encoded media stream by determining a decoding capacity of the remote media player and to adapt the encoding of the live encoded media stream in response to the monitoring to match the decoding capacity of the remote media player while the live encoded media stream is being transmitted on the network to thereby select a new quality level such that the live encoded media stream is delivered over the network to the remote media player at a rate that is faster than a playback rate of the remote media player.

7. The placeshifting device of claim 6 wherein processor adapts the encoding of the live encoded media stream by adjusting the encoding during transmission of the live encoded media stream so that the live encoded media stream is encoded faster than real time.

8. The placeshifting device of claim 6 wherein processor adapts the encoding of the live encoded media stream by adapting at least one of a bit rate, a frame rate, and a resolution of the encoded media stream.

9. The placeshifting device of claim 7 wherein the new quality level is deliberately set to be less than a maximum possible quality level so that some of the quality that would otherwise be available is traded for increased throughput.

10. The placeshifting device of claim 9 wherein the increased throughput is used to transmit advance video data to the player, thereby allowing the player to cache content that is not yet requested for playback in a buffer.

11. A remote media player device to render digital media content to a viewer, the remote media player device comprising:
   an interface to a network;
   a memory; and
   a processor configured to receive a media stream via the interface, wherein the media stream is live encoded by a remotely-located placeshifting device in response to a selection by the viewer while the media stream is being transferred to the media player device, wherein the processor is further configured to provide indicia of a decoding capacity of the remote media player device to the remotely-located placeshifting device, and wherein the processor is further configured to decode the encoded media stream for playback of the media stream to a viewer at a playback rate, wherein the encoded media stream is adapted in response to the decoding capacity of the remote media player device to be received at the remote media player device at a rate that is faster than the playback rate.

12. The remote media player device of claim 11 further comprising a buffer, and wherein the received media stream is stored in the buffer prior to playback of the media stream.

13. The remote media player device of claim 12 wherein the quality of the encoded media stream is adapted during transmission of the media stream over the network so that the media stream is encoded faster than real time.

14. The remote media player device of claim 13 wherein the quality is adapted by adapting at least one of a bit rate, a frame rate, and a resolution of the encoded media stream.

15. The remote media player device of claim 12 wherein the new quality level is deliberately set to be less than a maximum possible quality level so that some of the quality that would otherwise be available is traded for increased throughput.

16. The remote media player device of claim 15 wherein the increased throughput is used to transmit advance video data to the player, thereby allowing the player to cache content that is not yet requested for playback in the buffer.

17. The remote media player device of claim 16 wherein the processor is further configured to allow the viewer to fast forward ahead of a current viewing point by jumping to a later viewing point in the content that is cached in the buffer.

* * * * *